(12) United States Patent
Edwards et al.

(10) Patent No.: US 11,046,220 B2
(45) Date of Patent: Jun. 29, 2021

(54) VEHICLE SEATING SYSTEM

(71) Applicant: LEAR CORPORATION, Southfield, MI (US)

(72) Inventors: Chris Edwards, Alrewas (GB); Adam Clark, Thrapston (GB)

(73) Assignee: Lear Corporation, Southfield, MI (US)

( * ) Notice: Subject to any disclaimer, the term of this patent is extended or adjusted under 35 U.S.C. 154(b) by 86 days.

(21) Appl. No.: 16/571,701

(22) Filed: Sep. 16, 2019

(65) Prior Publication Data

US 2021/0078474 A1    Mar. 18, 2021

(51) Int. Cl.
| | | |
|---|---|---|
| *B60N 2/68* | (2006.01) | |
| *B60N 2/427* | (2006.01) | |
| *B60N 2/64* | (2006.01) | |

(52) U.S. Cl.
CPC ......... *B60N 2/686* (2013.01); *B60N 2/42709* (2013.01); *B60N 2/682* (2013.01); *B60N 2/64* (2013.01)

(58) Field of Classification Search
CPC .......... B60N 2/686; B60N 2/682; B60N 2/64; B60N 2/4249; B60N 2/42; B60N 2/427; B60N 2/42709; B60N 2/42745
USPC .......................... 297/216.13, 216.14, 452.18
See application file for complete search history.

(56) References Cited

U.S. PATENT DOCUMENTS

| | | | | | |
|---|---|---|---|---|---|
| 3,797,858 | A | * | 3/1974 | Yamada | B60N 2/42709 |
| | | | | | 280/751 |
| 4,493,505 | A | * | 1/1985 | Yamawaki | B60N 2/3013 |
| | | | | | 296/63 |
| 5,108,151 | A | * | 4/1992 | Peters | B60N 2/686 |
| | | | | | 297/452.18 |
| 5,219,202 | A | * | 6/1993 | Rink | B60N 2/42709 |
| | | | | | 297/216.13 |
| 8,955,906 | B2 | * | 2/2015 | Evans | B60N 2/4228 |
| | | | | | 297/216.13 |
| 2005/0206205 | A1 | * | 9/2005 | Nelson | B60N 2/42745 |
| | | | | | 297/216.14 |
| 2010/0244529 | A1 | * | 9/2010 | Braun | B60N 2/682 |
| | | | | | 297/354.12 |
| 2015/0336490 | A1 | | 11/2015 | Nie et al. | |
| 2017/0313225 | A1 | * | 11/2017 | Akaike | B60N 2/682 |
| 2018/0093589 | A1 | | 4/2018 | Sugiyama | |
| 2018/0222357 | A1 | | 8/2018 | Mochizuki et al. | |

FOREIGN PATENT DOCUMENTS

| | | | | | |
|---|---|---|---|---|---|
| CN | 104386137 A | * | 3/2015 | | |
| DE | 202017106649 U1 | * | 11/2017 | ............. | B60N 2/682 |
| FR | 2477990 A2 | * | 9/1981 | ........... | B60N 2/4249 |
| WO | WO-2010121296 A1 | * | 10/2010 | ......... | B60N 2/42709 |

* cited by examiner

*Primary Examiner* — Milton Nelson, Jr.
(74) *Attorney, Agent, or Firm* — Brooks Kushman P.C.

(57) ABSTRACT

A seating system for a vehicle includes a seat-back frame and a backboard attached to the seat-back frame. An attachment arrangement includes an elongated member attached to the seat-back frame and the backboard, and is configured to remain attached to the seat-back frame and the backboard by plastically deforming when the seat-back frame and the backboard are subjected to a separation force of a predetermined magnitude greater than a magnitude otherwise required to detach the elongated member from the backboard.

20 Claims, 6 Drawing Sheets

VEHICLE SEATING SYSTEM

TECHNICAL FIELD

The present disclosure relates to a seating system for vehicle.

BACKGROUND

Many vehicle seating systems include a seat back having a support structure such as a steel frame and a backboard fastened to the support structure. The backboard may be, for example, a relatively stiff polyurethane or other polymeric material. The backboard may be attached to the support structure with rigid attachment connections, such as fasteners directly attached to the rigid support structure. In the case of an impact event such as a rear-end collision, the backboard may experience a large separation force from the support structure caused by the rapid rearward motion of the seated occupant acting upon the seat's internal componentry—e.g., the climate systems—which in turn act upon the backboard. In the presence of such a force, one or more of the fasteners attaching the backboard to the support structure may fail to maintain the attachment because neither the support structure nor the fasteners yield. It would therefore be desirable to have a seating system for vehicle that included an attachment arrangement between a support structure of a seat and a backboard that was able to maintain an attachment even in the presence of a separation force.

SUMMARY

Embodiments described herein may include a seating system for a vehicle that includes a seat-back frame and a backboard attached to the seat-back frame. An attachment arrangement may include an elongated member fastened to the seat-back frame and fastened to the backboard with a first connection feature having a first connection strength. The elongated member may be configured to plastically deform such that the backboard remains attached to the seat-back frame and the backboard when the seat-back frame and the backboard are subjected to a separation force of a predetermined magnitude greater than the first connection strength.

Embodiments described herein may include a seating system for a vehicle that includes a seat-back frame and a backboard attached to the seat-back frame. An attachment arrangement may include an elongated member attached to the seat-back frame and the backboard. The elongated member may be configured to remain attached to the seat-back frame and the backboard by plastically deforming when the seat-back frame and the backboard are subjected to a separation force of a predetermined magnitude greater than a magnitude otherwise required to detach the elongated member from the backboard.

Embodiments described herein may include a seating system for a vehicle that includes a seat-back frame and a backboard attached to the seat-back frame. The elongated member may comprise a material having a yield strength of no more than 185 megapascals (MPa). The elongated member may be configured to remain attached to the seat-back frame and the backboard when the seat-back frame and the backboard are subject to a separation force of between 432 newtons (N) and 1602 N.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
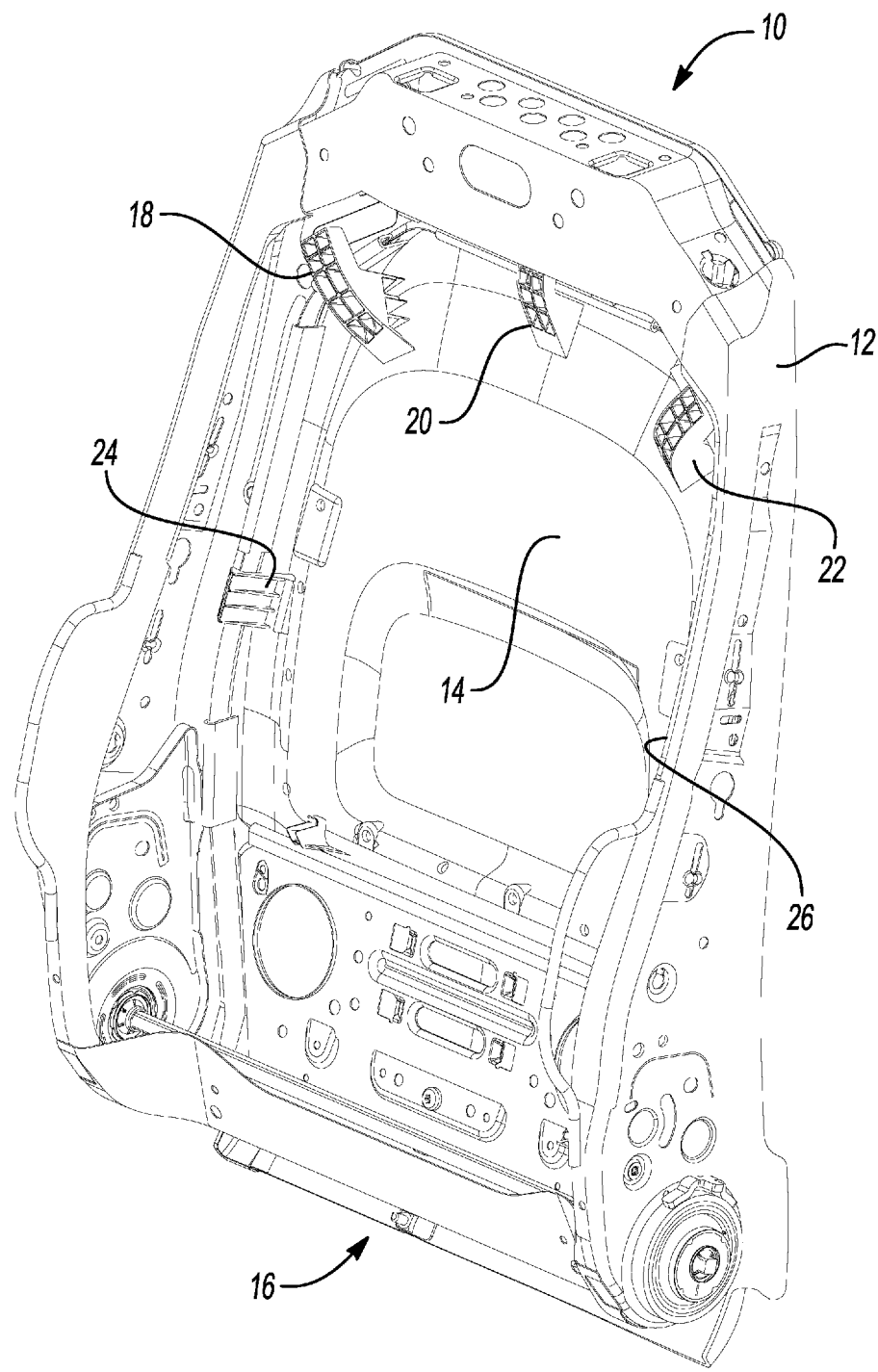
FIG. 1 shows a seating system in accordance with embodiments described herein.
Figure 2:
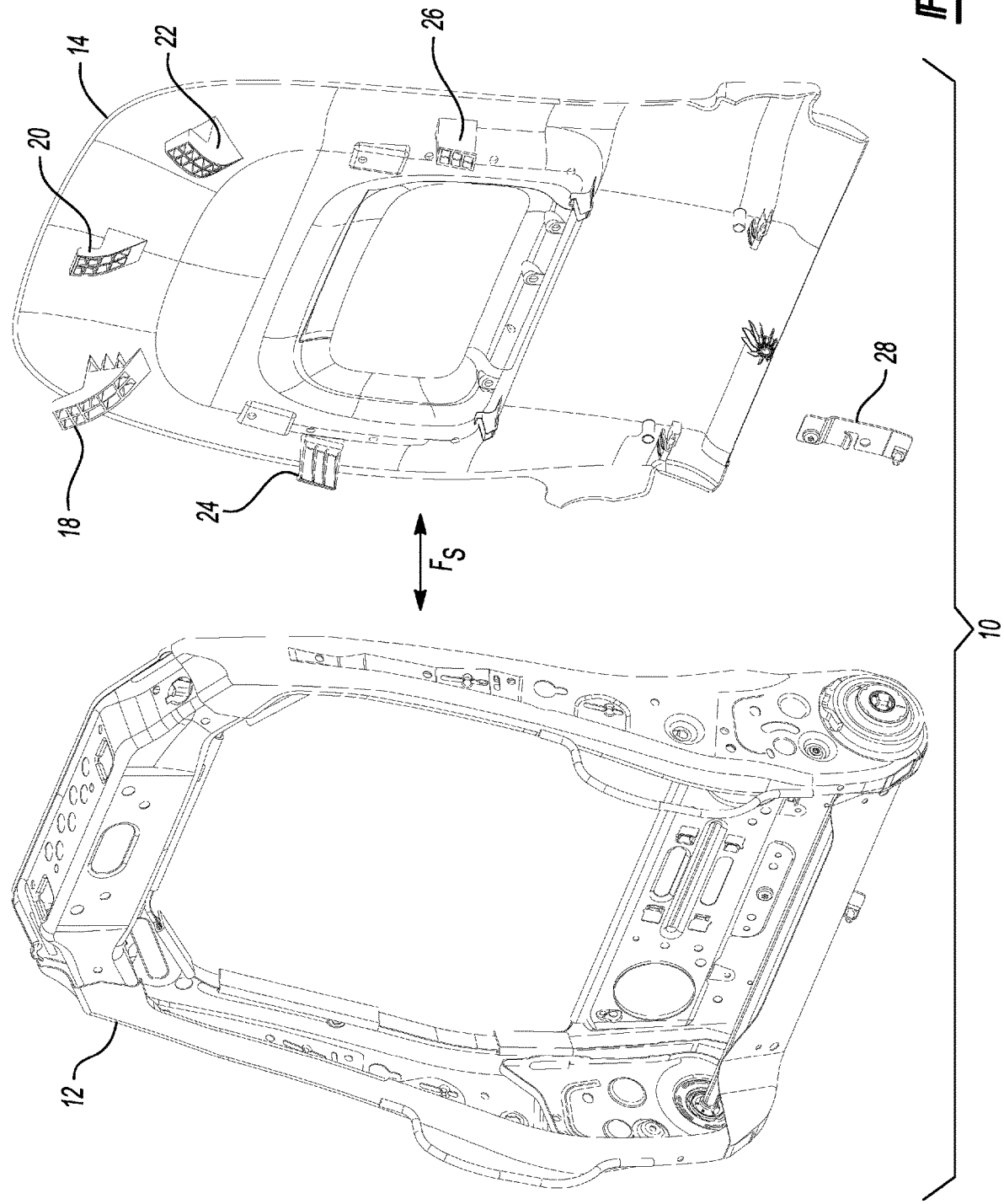
FIG. 2 shows an exploded view of the seating system shown in FIG. 1.

FIG. 1 shows a seating system 10 in accordance with embodiments described herein. The seating system 10 includes a seat-back frame 12 and a backboard 14 attached to the seat-back frame 12. The seating system 10 also includes an attachment arrangement 16, some of which is shown in FIG. 1. For example, the attachment arrangement 16 includes a plurality of fasteners, which in the embodiment shown in FIG. 1, includes hooks 18, 20, 22 and clips 24, 26. The attachment arrangement 16 also includes an elongated member 28 shown in FIG. 2. As described in more detail below, the elongated member 28 is attached to both the seat-back frame 12 and the backboard 14 and is configured to plastically deform when the seat-back frame 12 and the backboard 14 are subjected to a separation force of a predetermined magnitude that is greater than a magnitude that would otherwise be required to detach the elongated member 28 from the backboard 14—see, e.g., the force ($F_s$) shown in FIG. 2. As it plastically deforms the elongated member 28 absorbs energy so that the entire separation force is not realized at the connection points.

Figure 3:
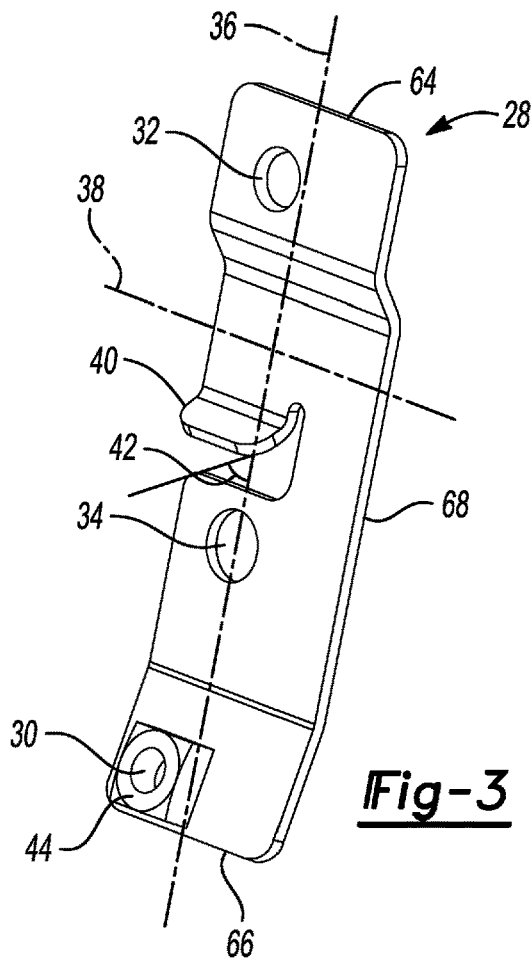
FIG. 3 shows an elongated member forming a portion of an attachment arrangement for a seating system in accordance with embodiments described herein.
Figure 4:
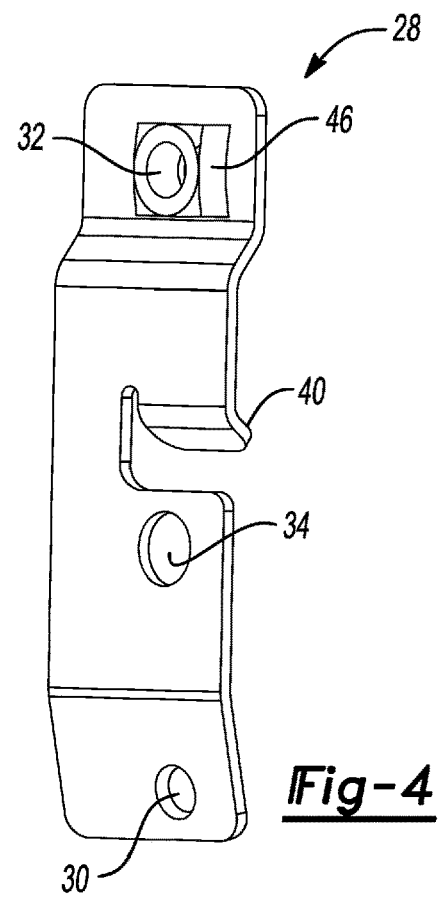
FIG. 4 shows another view of the elongated member shown in FIG. 3.

FIGS. 3 and 4 show detailed views of the elongated member 28. The elongated member 28 includes a first location 30 where it is attached to the backboard 14, and a second location 32 where it is attached to the seat-back frame 12. An opening 34 may be conveniently provided in the elongated member 28 to provide attachment of other seating features, such as wire harnesses, etc. A length of the elongated member 28 defines a longitudinal axis 36 and a width of the elongated member 28 defines a transverse axis 38. As shown in FIG. 3, the elongated member 28 includes a projection 40 that extends outward at an angle 42 from the longitudinal axis 36.

Figure 7:
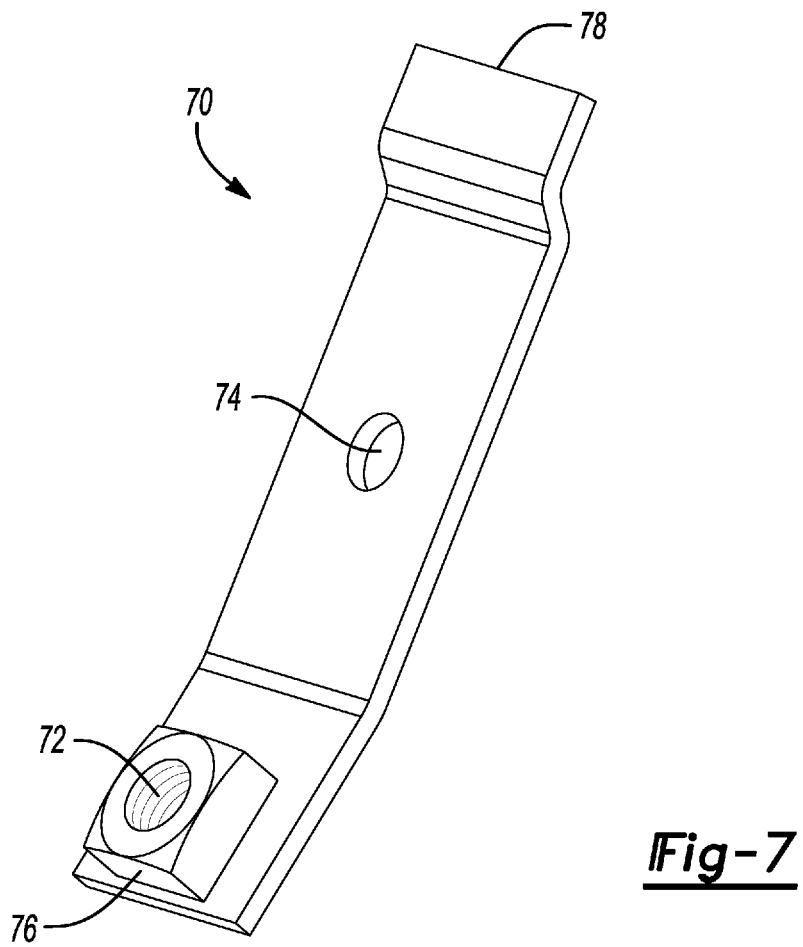
FIG. 7 shows an elongated member forming a portion of an attachment arrangement for a seating system in accordance with embodiments described herein.

Also shown in FIG. 3, the projection 40 is formed along the transverse axis 38—i.e., it is in the same direction or parallel to the transverse axis 38, but not necessarily coincident with it—and it is formed over less than the entire width of the elongated member 28. In other embodiments, such as illustrated in FIG. 7, a projection may extend over an entire width of an elongated member. As described in more detail in conjunction with FIG. 5, the projection 40 is configured to cooperate with an aperture in the seat-back frame 12 to dispose the elongated member 28 at a predetermined position relative to the seat-back frame 12 to facilitate proper positioning during assembly. In other embodiments, a projection, such as the projection 40, may cooperate with a backboard, such as the backboard 12, to properly position a corresponding elongated member.

Figure 5:
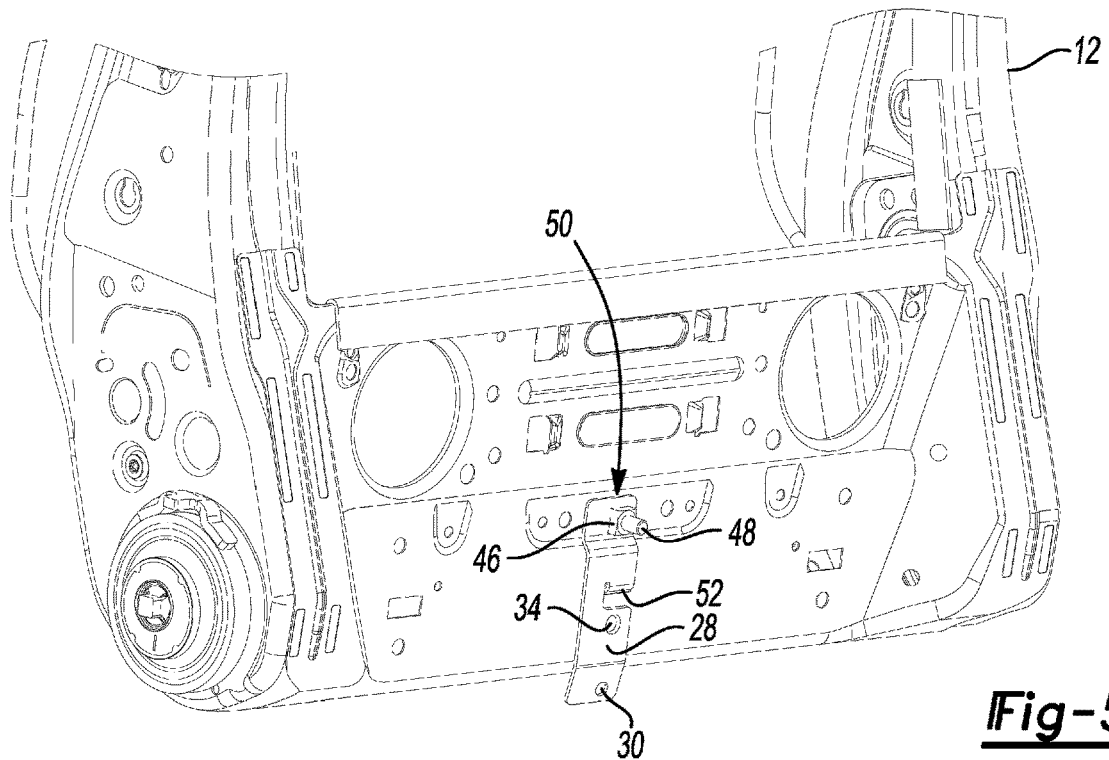
FIG. 5 shows the elongated member attached to a seat-back frame of a seating system.
Figure 6:
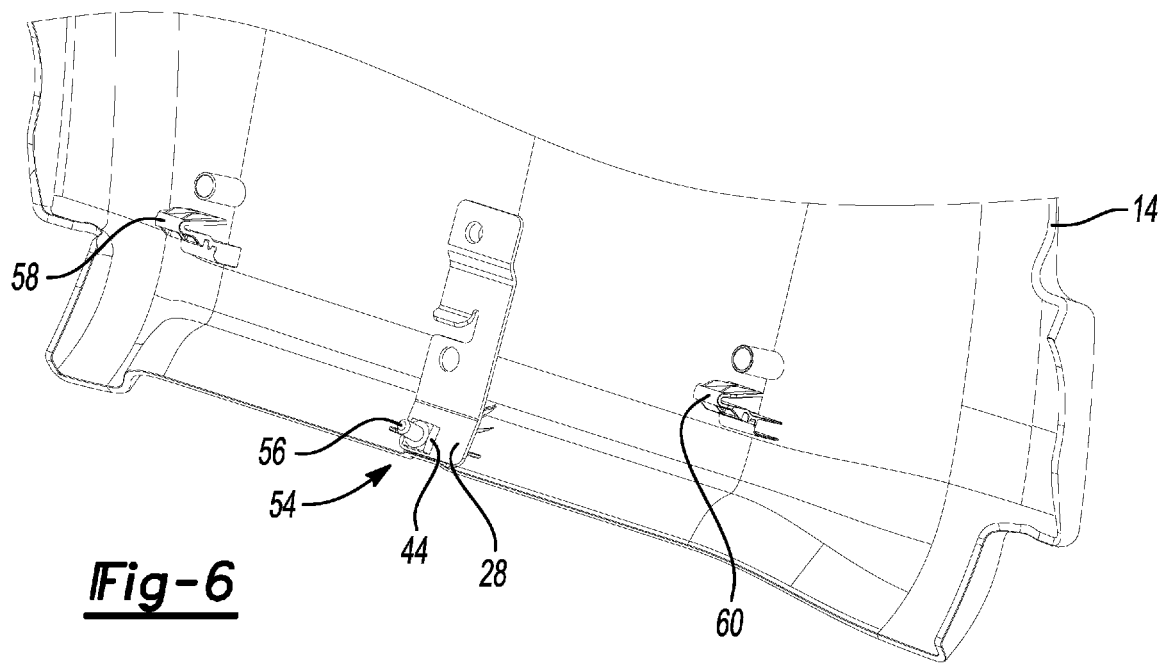
FIG. 6 shows the elongated member attached to a backboard of a seating system.

As shown in FIG. 3, the elongated member 28 includes a weld nut 44 positioned at the first connection location 30, which, as described in more detail in conjunction with FIG. 6, is part of a first connection feature for connecting the elongated member 28 to the backboard 14. As shown in FIG. 4, the elongated member 28 includes another weld nut 46 positioned at the second connection location 32. As described in more detail in conjunction with FIG. 5, the weld nut 46 is part of a second connection feature for connecting the elongated member 28 to the seat-back frame 12. In other embodiments, a clinch nut may be attached to an elongated member, such as the elongated member 28, or other types of fastening mechanisms may be employed.

FIG. 5 shows the back of the seat-back frame 12 with the elongated member 28 attached to it. As shown in FIG. 5, the weld nut 46 and a bolt 48 threaded into the weld nut 46 to form the second connection feature 50. As shown in FIG. 5, the seat-back frame 12 includes a rectangular aperture 52 into which the projection 40 is inserted during assembly. This positions the elongated member 28 at a desired location relative to the seat-back frame 12, and more specifically, positions the elongated member 28 properly so that the first location 30 in the elongated member 28 will align with a corresponding first location on the seat-back frame 12. More specifically, so that the bolt 48 can be inserted through an opening in the seat-back frame 12 and will align with the weld nut 46. Similarly, insertion of the projection 40 into the aperture 52 helps to ensure that the opening 34 is aligned with a corresponding opening in the seat-back frame 12 to facilitate attachment of other seating elements, and also helps to ensure that the hole at the first location 30 aligns with a corresponding first location on the backboard 14—see FIG. 6.

FIG. 6 shows the elongated member 28 attached to the backboard 14 with the first connection feature 54, which includes the weld nut 44 and a bolt 56 inserted through a back side of the backboard 14 and threaded into the weld nut 44. Also shown in FIG. 6 are additional fasteners, which in this embodiment are clips 58, 60, and which form a part of the attachment arrangement 16. The first connection feature 54 has a "first connection strength". Unless otherwise defined, the term "connection strength" as used herein refers to the ability of a connection feature to maintain a connection. A connection feature, such as the connection feature 50, may fail to maintain a connection for any number of reasons. For example, the threads in the weld nut 44 or the threads on the bolt 56 may strip in the presence of a large enough force, the material from which the elongated member 28 is made may suffer a catastrophic failure, or the material in the backboard 14 may fail. Therefore, the "connection strength" does not need to be defined in terms of a stress measured during a standardized material-properties test, but rather may be defined in terms of a maximum separation force the associated connection feature may withstand while still maintaining the connection.

As described above, the elongated member 28 is configured to plastically deform in the presence of a separation force of a predetermined magnitude—for example, when a seated occupant is forced rearward into the seat back after a rear-end collision. In at least one embodiment, the separation force of the predetermined magnitude may be 432 N, which is an initial level of force that may be expected during a rear-end collision in a vehicle in which the seating system 10 is installed. Of course, the separation force may vary throughout the entire collision event, and may range from 432 N to 1602 N, as one example. Many fasteners or the material they are fastening may fail when subject to a large separation force, particularly when the connection is rigid. For example, the first connection feature 54 may otherwise fail when subject to a separation force of a magnitude seen during a rear-end collision; however, because the elongated member 28 is specifically configured to plastically deform, the connection between the elongated member 28 and the backboard 14 may be maintained.

In at least some embodiments, the elongated member 28 may be made from a steel material, and more particularly, a mild steel such as DC01. Material properties for this kind of steel may vary, although in some embodiments, the yield strength of this steel may be 185 MPa, or in some embodiments, no more than 185 MPa, and it may have a Young's modulus of approximately 206 MPa. In general, the yield strength for this kind of steel may vary between 140 MPa and 280 MPa. The configuration of the elongated member may include not only the type of material from which it is made, but also its dimensions. For example, a length of the elongated member 28 between the first and second locations 30, 32 may be approximately 67 millimeters (mm). A width of the elongated member 28 may be approximately 26 mm, and it may have a thickness of approximately 1.5 mm. The width of the projection 40 may be approximately 13 mm, and at the projection 40, the remaining width of the elongated member 28 may be approximately 10.5 mm. Elongated members in accordance with seating systems described herein may have other dimensions and may be made from other materials provided they are effective to perform the intended function of undergoing plastic deformation when subject to a separation force of a predetermined magnitude. In fact, these elongated members may be "tuned" to a particular application where separation forces are known or estimated with reasonable accuracy. More specifically, the material properties and dimensions of an elongated member may be chosen so it performs as intended when subjected to the separation forces.

When the elongated member 28 plastically deforms, it absorbs energy from the separation force so that less than the entire separation force is experienced by the first connection feature 54. In this way, the backboard 14 and seat-back frame 12 may be subject to a separation force that is greater than the first connection strength, but because of the plastic deformation of the elongated member 28, which absorbs energy as it deforms, the first connection feature may only be subject to a fraction of the total separation force so that the connection between the backboard 14 and the seat-back frame 12 is maintained.

If, for example, the first connection strength is less than 432 N, and a separation force between the backboard 14 and the seat-back frame 12 is 432 N or greater, the connection between the backboard 14 of the seat-back frame 12 could fail if all of the connections between the backboard 14 on the seat-back frame 12 are rigid—i.e., all of the connections were configured to deform elastically only. Because of the plastic deformation of the elongated member 28, however, the first connection strength is not exceeded even though the total separation force is greater than the first connection strength. In this way, the elongated member 28 is configured to remain attached to both the seat-back frame 12 and the backboard 14 even when the seat-back frame 12 in the backboard 14 are subjected to a separation force of a predetermined magnitude greater than a magnitude otherwise required to detach the elongated member 28 from the backboard 14. As described above, the attachment arrangement 16 may include not only the elongated member 28, but also hooks 18, 20, 22, clips 24, 26, and the clips 58, 60 shown in FIG. 6. At least some of these fasteners provide a respective connection strength between the backboard 14 and the seat-back frame 12 that is less than the separation force of the predetermined magnitude—e.g., 432 N. Because these are rigid connectors not configured to plastically deform, at least some may fail when subjected to the separation force.

In the embodiment shown in FIGS. 3 and 4, the elongated member 28 includes two end portions 64, 66 and a central portion 68. As shown in the drawing figures, the projection 40 extends from the central portion 68. In FIG. 7, another embodiment of an elongated member 70 is illustrated. In this embodiment, the elongated member 70 includes a first location 72 and a second location 74. Similar to the embodiment shown in FIGS. 3 and 4, the first location 72 on the elongated member 70 includes a weld nut 76 configured to receive a bolt positioned through a backboard, such as the backboard 14. In the embodiment shown in FIG. 7, the second location 74 is configured as an aperture that is configured to receive a bolt or other fastener to attach the elongated member 70 to a seat-back frame, such as the seat-back frame 12. The elongated member 70 also includes a projection 78, but in this embodiment, the projection 78 extends across an entire width of the elongated member 70 and is positioned at one of the ends.

Figure 8:
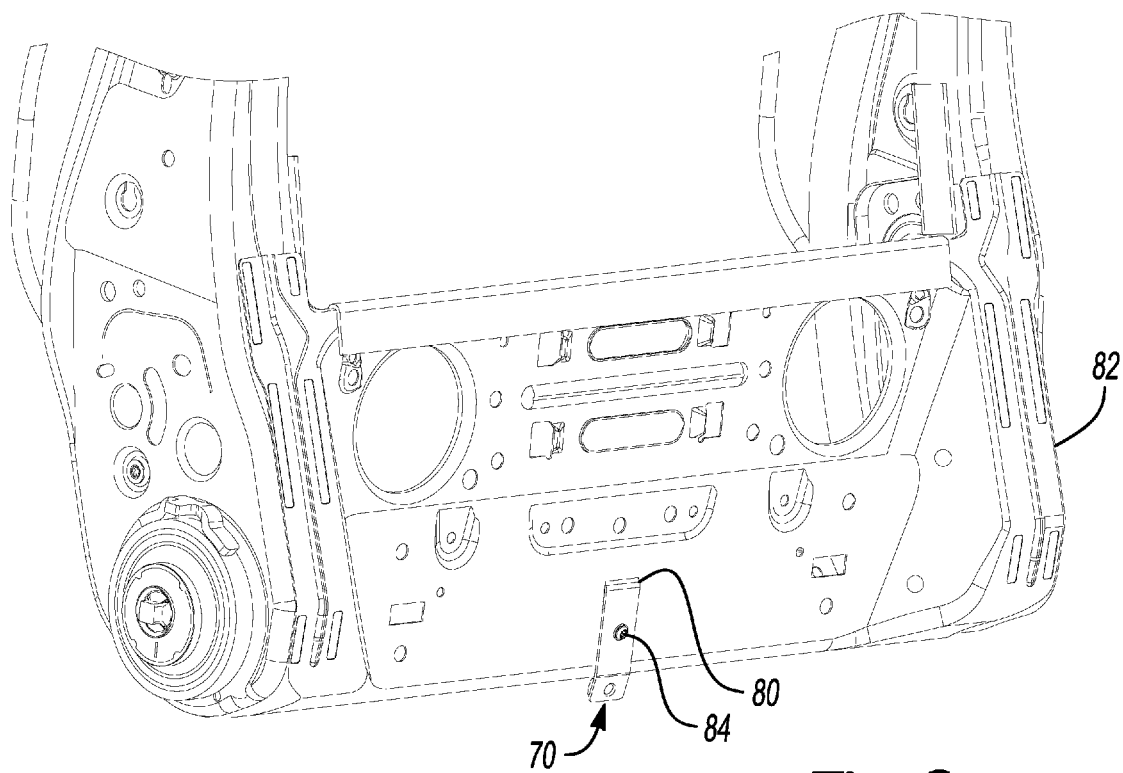
FIG. 8 shows the elongated member shown in FIG. 7 attached to a seat-back frame.
Figure 9:
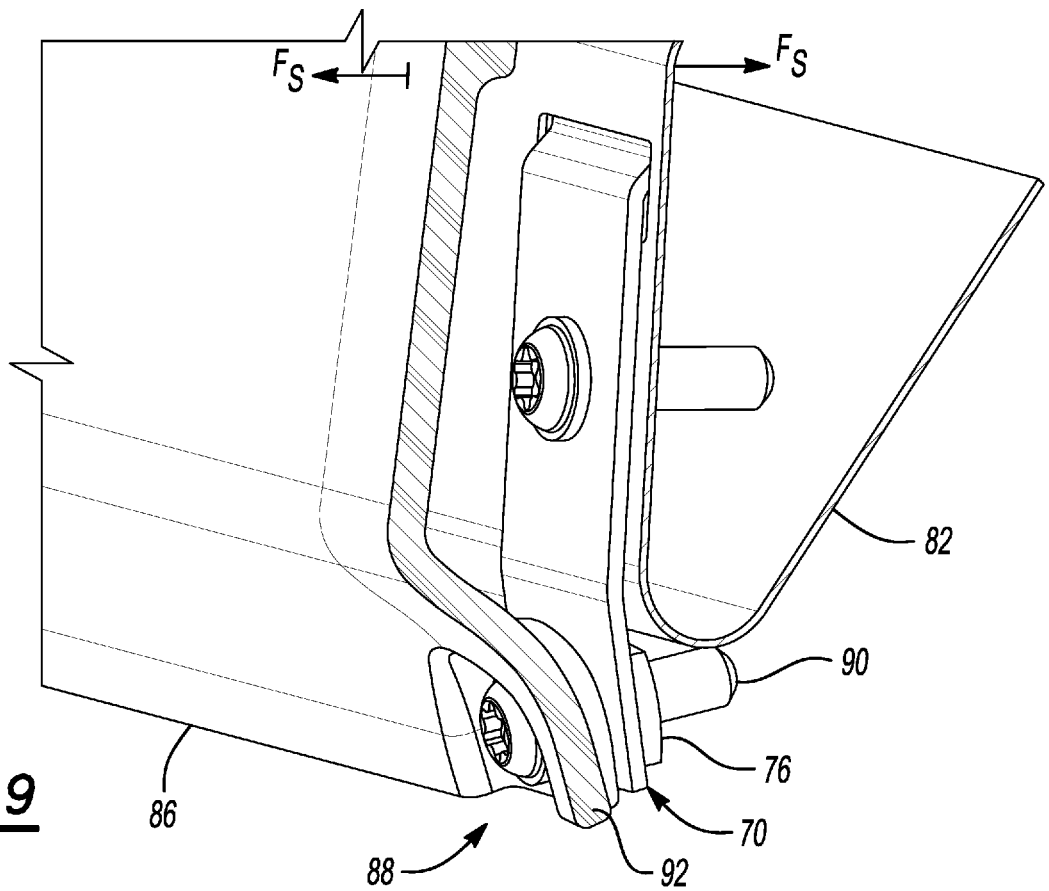
FIG. 9 shows the elongated member shown in FIG. 7 attached to a seat-back frame and a backboard.

As shown in FIG. 8, the projection 78 fits into a rectangular aperture 80 in a seat-back frame 82. Similar to the projection 40 described above, the projection 80 helps to position the elongated member 70 for proper alignment with the seat-back frame 82 and a backboard, such as the backboard 14. Also shown in FIG. 8, the elongated member 70 is attached to the seat-back frame 82 with a bolt 84. As described above, elongated members such as the elongated members 28, 70 are configured to plastically deform when subject to a separation force acting on the backboard and seat-back frame. FIG. 9 shows the elongated member 70 attached to the seat-back frame 82 and a backboard 86.

Figure 10:
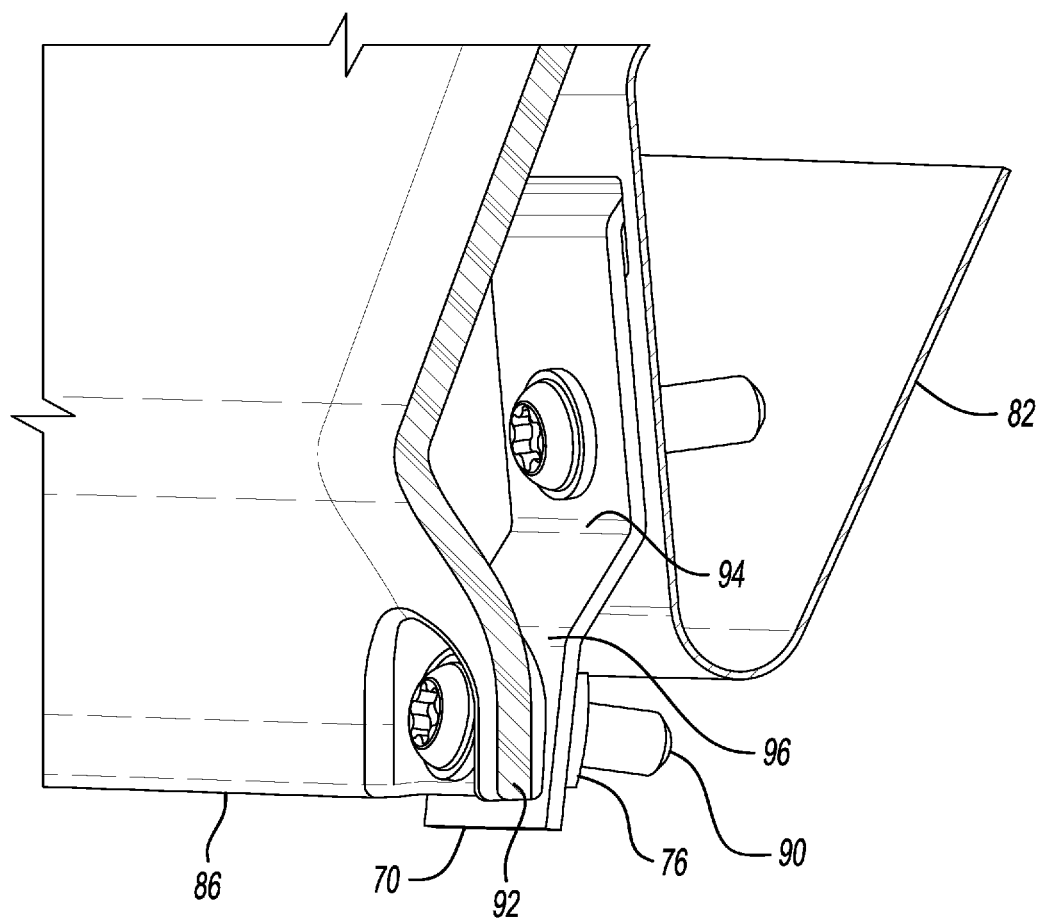
FIG. 10 shows the elongated member attached to the seat-back frame and the backboard after a separation force was applied to the seat-back frame and the backboard.

The elongated member 70 is attached to the backboard 86 with a first connection feature 88, which includes the weld nut 76, a bolt 90, and a flange 92 formed in the backboard 86. The first connection feature 88 may have a first connection strength of, for example, no more than 432 N. A separation force ($F_s$) is also shown acting on the backboard 86 and the seat-back frame 82. As described above, the separation force ($F_s$) may be greater than 432 N and yet the first connection strength will not be exceeded because the first connection feature 88 will not see all of the 432 N force. Instead, the elongated member 70 will deform as shown in FIG. 10. Specifically, the elongated member 70 bends at two locations 94, 96, and may, for example, deflect approximately 32 mm from its original location. As shown in FIG. 10, the elongated member 70 is still attached to the backboard 86 and the seat-back frame 82, and the weld nut 76, the bolt 90, and the flange 92 of the backboard 86 are all still intact. The elongated member 70 therefore acts not only as a bracket to maintain a connection between the backboard 86 and the seat-back frame 82 under unloaded conditions, but also acts as a tether to keep the two pieces together in the event of a large separation force.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seating system for a vehicle comprising:
a seat-back frame;
a backboard attached to the seat-back frame; and
an attachment arrangement including an elongated member fastened to the seat-back frame and fastened to the backboard with a first connection feature having a first connection strength, the elongated member being configured to plastically deform such that the elongated member remains attached to the seat-back frame and the backboard when the seat-back frame and the backboard are subjected to a separation force of a predetermined magnitude greater than the first connection strength.

2. The seating system of claim 1, wherein the attachment arrangement further includes a plurality of fasteners separate from the elongated member, at least some of the fasteners providing a respective connection strength between the backboard and the seat-back frame that is less than the separation force of the predetermined magnitude.

3. The seating system of claim 1, wherein the elongated member is fastened to the backboard at a first location on the elongated member and fastened to the seat-back frame at a second location on the elongated member, and wherein at least one of the seat-back frame or the backboard includes an aperture configured to cooperate with the elongated member such that at least one of the first location of the elongated member is positioned relative to a corresponding first location on the backboard or the second location of the elongated member is positioned relative to a corresponding second location on the seat-back frame.

4. The seating system of claim 1, wherein a length of the elongated member defines a longitudinal axis, and the elongated member includes a projection extending outward at an angle from the longitudinal axis and configured to cooperate with an aperture in the seat-back frame or the backboard to dispose the elongated member at a predetermined position relative to the seat-back frame or the backboard.

5. The seating system of claim 4, wherein a width of the elongated member defines a transverse axis, and the projection is formed along the transverse axis over less than all of the width.

6. The seating system of claim 1, wherein the elongated member is configured to deflect when the separation force of the predetermined magnitude is at least 432 N.

7. The seating system of claim 6, wherein the elongated member comprises a steel material having a yield strength of no more than 185 MPa.

8. A seating system for a vehicle comprising:
a seat-back frame;
a backboard attached to the seat-back frame; and an attachment arrangement including an elongated member attached to the seat-back frame and the backboard, the elongated member being configured to remain attached to the seat-back frame and the backboard by plastically deforming when the seat-back frame and the backboard are subjected to a separation force of a predetermined magnitude greater than a magnitude otherwise required to detach the elongated member from the backboard.

9. The seating system of claim 8, wherein the separation force of the predetermined magnitude is between 432 N and 1602 N.

10. The seating system of claim 8, wherein at least one of the seat-back frame or the backboard includes an aperture configured to cooperate with the elongated member such that the elongated member is positioned at a desired location relative to at least one of the seat-back frame or the backboard.

11. The seating system of claim 8, wherein the elongated member includes a projection extending outward at an angle therefrom and configured to cooperate with an aperture in the seat-back frame or the backboard to position the elongated member at a desired location relative to at least one of these frame or the backboard.

12. The seating system of claim 11, wherein the elongated member includes two end portions and a central portion, and the projection extends from the central portion.

13. The seating system of claim 12 wherein the elongated member has a first width at the end portions and a second width at the projection that is less than the first width.

14. The seating system of claim 8, wherein the elongated member comprises a material having a yield strength of 185 MPa or less.

15. A seating system for a vehicle comprising:
a seat-back frame;
a backboard attached to the seat-back frame; and
an attachment arrangement including an elongated member attached to the seat-back frame and the backboard and comprising a material having a yield strength of no more than 185 MPa, the elongated member being configured to remain attached to the seat-back frame and the backboard when the seat-back frame and the backboard are subject to a separation force of between 432 N and 1602 N.

16. The seating system of claim 15, wherein the elongated member is attached to the backboard with a connection feature have a connection strength less than 432 N.

17. The seating system of claim 15, wherein the elongated member is fastened to the backboard at a first location on the elongated member and fastened to the seat-back frame at a second location on the elongated member, and wherein at least one of the seat-back frame or the backboard includes an aperture configured to cooperate with the elongated member such that at least one of the first location of the elongated member is positioned relative to a corresponding first location on the backboard or the second location of the elongated member is positioned relative to a corresponding second location on the seat-back frame.

18. The seating system of claim 15, wherein a length of the elongated member defines a longitudinal axis, and the elongated member includes a projection extending outward at an angle from the longitudinal axis and configured to cooperate with an aperture in the seat-back frame or the backboard to dispose the elongated member at a predetermined position relative to the seat-back frame or the backboard.

19. The seating system of claim 18, wherein a width of the elongated member defines a transverse axis, and the projection is formed along the transverse axis over less than all of the width.

20. The seating system of claim 15, wherein the elongated member comprises a steel material.

* * * * *